United States Patent [19]

Shimizu et al.

[11] 4,390,245
[45] Jun. 28, 1983

[54] OPTICAL DISPLAY CELL OF EVEN THICKNESS USING ADHESIVE MEANS AND SEPARATE ADHESIVE-FREE SPACERS

[75] Inventors: Keiichiro Shimizu, Nara; Wataru Horii, Yokohama, both of Japan

[73] Assignee: Sharp Kabushiki Kaisha, Osaka, Japan

[21] Appl. No.: 169,387

[22] Filed: Jul. 16, 1980

[30] Foreign Application Priority Data

Jul. 19, 1979 [JP] Japan .................................. 54-91847

[51] Int. Cl.³ ............................................. G02F 1/13
[52] U.S. Cl. ................................... 350/343; 350/344
[58] Field of Search ....................... 350/343, 344, 357

[56] References Cited

U.S. PATENT DOCUMENTS

| | | | |
|---|---|---|---|
| 3,592,526 | 7/1971 | Dreyer | 350/344 |
| 3,771,855 | 11/1973 | Burns | 350/343 |
| 3,836,229 | 9/1974 | Saurer | 350/357 X |
| 3,866,313 | 2/1975 | Yih | 350/343 X |
| 3,912,365 | 10/1975 | Lowell | 350/344 |
| 3,990,781 | 11/1976 | Gam | 350/343 |
| 3,994,567 | 11/1976 | Matsuo et al. | 350/343 X |
| 4,130,408 | 12/1978 | Crossland et al. | 350/344 X |
| 4,165,157 | 8/1979 | Kobale et al. | 350/343 |
| 4,231,034 | 10/1980 | Bechteler | 350/344 X |
| 4,249,800 | 2/1981 | Spruijt | 350/344 X |

Primary Examiner—John K. Corbin
Assistant Examiner—David Lewis
Attorney, Agent, or Firm—Birch, Stewart, Kolasch & Birch

[57] ABSTRACT

An optical display cell comprising a pair of substrates at least one of which is transparent, a sealing element for sealing the pair of substrates at their peripheral portions, and an adhesive for bonding portions of the pair of substrates inboard of the sealing element. By the adhesive, the distance between the pair of substrates is maintained approximately constant. Preferably, the adhesive is composed of Nylon or the like. In addition, a spacer member can be provided for maintaining the distance between the pair of substrates approximately uniform. Preferably, the spacer member is made of glass fiber. More preferably, the adhesive is attached to one of the substrates so as to indicate a specific type of symbol such as a line, a unit, or the like.

17 Claims, 4 Drawing Figures

OPTICAL DISPLAY CELL OF EVEN THICKNESS USING ADHESIVE MEANS AND SEPARATE ADHESIVE-FREE SPACERS

BACKGROUND OF THE INVENTION

The present invention relates to an optical display cell and, more particularly, to a structure of such an optical display cell including a layer of a liquid.

It is well known in the art that an optical display cell such as a liquid crystal display, an electrochromic display, and the like contains a layer of a liquid such as a liquid crystal material and an electrolyte. The film is confined within two substrates. The peripheral portions of the substrates are joined by a sealing member while the central portions are not joined. In such structures, the distance between the substrates at their central portions may not be uniform due to the absence of any adhesive at these points.

When the distance is not uniform, interference fringes develop so that a visual display of the optical display cell is damaged.

Therefore, it is desirable that the distance between the two substrates in the optical display cell be kept constant as much as possible.

SUMMARY OF THE INVENTION

Accordingly, it is an object of the present invention to provide an improved optical display cell in which the distance between two substrates is kept constant over a display region of the display cell.

It is another object of the present invention to provide an improved adhesive used for forming an optical display cell so as to maintain the distance between the two substrates uniform as widely as possible.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an optical display cell comprises a pair of substrates at least one of which is transparent, a sealing element for sealing the pair of substrates by combining their peripheral portions, and an adhesive for bonding portions of the pair of substrates inboard of the sealing element. By the adhesive, the distance between the pair of substrates is maintained approximately constant. Preferably, the adhesive is composed of Nylon or the like. In addition, a spacer member can be provided for keeping the substrate-to-substrate distance approximately uniform. Preferably, the spacer member is made of glass fiber. More preferably, the adhesive is attached to one of the substrates so as to indicate a specific type of symbol such as a line, a unit, or the like, flanked with color filters or otherwise.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Initially, the term "optical display cell" as used herein means an electro-optic device such as a liquid crystal display including a thin film of a liquid crystal material, an electrochromic display including a layer of an electrolyte, or the like. For the sake of description, the electro-optic device is referred to only as a liquid crystal display. The present invention can be incorporated into the electrochromic display or the like within the knowledge of those skilled in the art.

Figure 1:
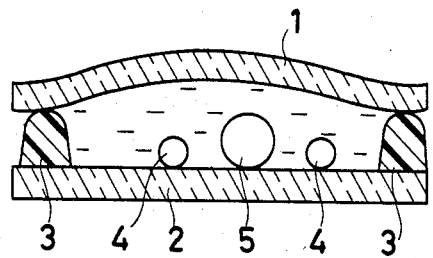
FIGS. 1, 2 and 4 show a cross-sectional view of an optical display cell according to the present invention.
Figure 2:
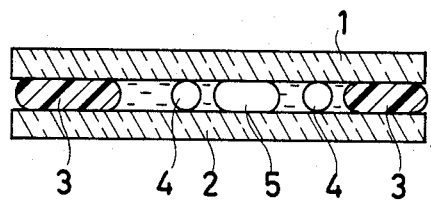

Turning now descriptively to the drawings, in which similar reference characters denote similar elements throughout the several views, FIGS. 1 and 2 show the optical display cell of the present invention in a cross-sectional view.

With reference to FIGS. 1 and 2, there are indicated two substrates 1 and 2, sealing elements 3, a spacer 4, and an adhesive 5. The two substrates 1 and 2 are preferably made of glass. On one of them, there is disposed a counter electrode (not shown) while there are disposed on the other of them a plurality of segmented display electrodes (not shown), preferably, arranged in a form of minus-in-square configuration.

The sealing elements 3 are provided for combining the two substrates 1 and 2 to make a cavity therebetween. Preferably, the sealing element 3 is made of epoxy synthetic resin of a thermally hardening type. A conventional liquid crystal material is disposed within the cavity defined by the two substrates 1 and 2.

The spacer 4 is dispersed within the liquid crystal material for keeping the distance between the two substrates 1 and 2 approximately uniform. More desirably, the spacer 4 is made of a glass fiber in a form of particles having a diameter of about 6 $\mu$m. It is preferable that the spacer 4 is scattered over the liquid crystal material as widely as possible.

The adhesive 5 is provided for adhering to the two substrates 1 and 2. Preferably, it is positioned at the approximate center of the substrates 1 and 2. More desirably, the adhesive 5 is in a form of particles having a diameter of about 15 to about 20 $\mu$m, made of nylon or the like. It is not important that the adhesive 5 is transparent. For example, Nylon Adhesive Agents FS-175P manufactured by Toagosei Chemical Industry Co., Ltd. can be adopted for the adhesive 5.

Manufacturing methods of the liquid crystal display are explained with reference to FIGS. 1 and 2. Firstly, the adhesive 5 is disposed on the substrate 2. The spacer 4 is positioned widely over the substrate 2. Then the substrate 1 is attached with the help of the sealing elements 3 and the adhesive 5 by being pressed. Even if the substrates 1 is curved as shown in FIG. 1, it is made flat by being pressed and then is combined with the substrate 2 by the sealing elements 3 and the adhesive 5 as shown in FIG. 2. The sealing elements 3 function to bond the substrates 1 and 2 at their peripheries. The adhesive 5 acts to bond them at their approximate centers. The spacer 4 operates to define and maintain a predetermined distance between the substrates 1 and 2. A conventional liquid crystal material is disposed within the cavity defined by the substrates 1 and 2.

After the adhesive 5 is hardened, the predetermined distance of the substrates 1 and 2 is approximately maintained even in the removal of pressure. Therefore, no interference fringe develops on the substrates 1 and 2.

Figure 4:
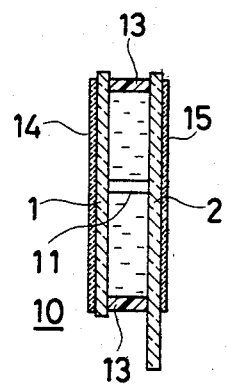
Figure 3:
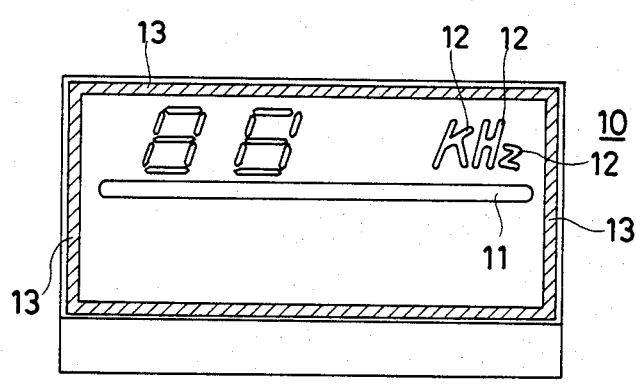
FIG. 3 shows a plan view of the optical display cell with regard to FIG. 4.

FIGS. 3 and 4 show another preferred embodiment of the present invention. A liquid crystal display 10 of FIGS. 3 and 4 comprises the substrates 1 and 2, adhesive 11 and 12, a sealing element 13, and polarizers 14 and 15.

The materials of the adhesives 11 and 12 are identical to the material of the adhesive 5. The material of the sealing element 13 is identical to that of the sealing element 3. The adhesive 11 extends along the longitudinal side of the liquid crystal display 10 and is disposed approximately center of the same. The adhesive 12 forms a desirable visual symbol, such as, "KHz". Segmented display electrodes and a counter electrode are provided on the substrates 1 and 2, respectively. A group of segmented display electrodes and counter electrode are prepared at each area of the display 10 is devided by the adhesive 11.

A pair of polarizers 14 and 15 are disposed on all the surfaces of the substrates 1 and 2.

The substrates 1 and 2 are pressed to each other to complete the liquid crystal display cell. By the adhesives 11 and 12, the distance between the substrates 1 and 2 is maintained constant after the adhesives 11 and 12 are hardened to bond the substrates 1 and 2.

The adhesives 11 and 12 are viewed by the operator through the polarizers 14, 15. When the polarizers 14 and 15 are a black filter, for example, the adhesives 11 and 12 are seen as a black straight line and a black symbol of "KHz", respectively. Upon the application of voltage into selected segmented display electrodes, desirable symbols become visible, for example, "88" as shown in FIG. 3. Therefore, "88 KHz" is shown with a black straight line as represented in FIG. 3.

According to the another preferred form of the present invention, a desirable indication such as a separation line, unit symbol, and the like can be pointed out by the adhesive means functioning to maintain the distance between the substrates 1 and 2 approximately constant. No interference fringe develop on the optical display.

While only certain embodiments of the present invention have been described, it will be apparent to those skilled in the art that various changes and modifications may be made therein without departing from the spirit and scope of the invention as claimed.

What is claimed is:

1. An optical display cell comprising:
    a pair of substrate means at least one of which is transparent;
    sealing means provided for sealing the pair of substrate means by joining the peripheral portions thereof;
    adhering means provided for bonding portions of the pair of substrate means inboard of the sealing means; and
    adhesive-free spacer means randomly disposed between said pair of substrate means for maintaining an approximately uniform distance between said pair of substrate means.

2. The optical display cell as set forth in claim 1, wherein the adhering means comprises a nylon adhesive.

3. The optical display cell as set forth in claim 1, wherein the spacer means comprises a glass fiber material.

4. The optical display cell as set forth in claim 1, wherein the adhering means provides a constant visual symbol.

5. The optical display cell as set forth in claim 1, wherein the optical display cell is a liquid crystal display cell including a liquid crystal material.

6. The optical display cell as set forth in claim 1, wherein the optical display cell is an electrochromic display cell containing an electrolyte.

7. An optical display cell comprising:
    a pair of substrate means at least one of which is transparent;
    sealing means provided for sealing the pair of substrate means by joining the peripheral portions thereof;
    adhering means for bonding portions of the pair of substrate means inboard of said sealing means, said adhering means providing a constant visual symbol; and
    adhesive-free optically transparent spacer means randomly disposed between said pair of substrate means for maintaining an approximately uniform distance between said pair of substrate means.

8. An optical display cell as in claim 7, wherein said adhering means comprises a nylon adhesive.

9. An optical display cell as in claim 7, wherein said spacer means comprises a glass fiber material.

10. An optical display cell as in claim 7, wherein the optical display cell is a liquid crystal display cell including a liquid crystal material.

11. An optical display cell as in claim 7, wherein the optical cell is an electrochromic display cell containing an electrolyte.

12. A method of making an optical display cell in which a pair of substrate means are joined at the peripheral portions thereof by a sealing means, comprising the steps of:
    depositing a sealing means at the periphery of a first one of a pair of substrate means;
    depositing an adhesive on said first substrate means inboard of said sealing means;
    randomly disposing a plurality of adhesive-free spacer means on said first substrate means for maintaining an approximately uniform distance between said pair of substrate means; and
    pressing said pair of substrates together with said spacer means therebetween while raising the temperature to a temperature sufficient to soften said sealing means.

13. The method of claim 12, wherein said adhesive is a nylon adhesive.

14. The method of claim 12, wherein said spacer means comprises glass fiber material.

15. The method of claim 12, wherein said adhesive is deposited in specific areas to provide a constant visual symbol.

16. A method of making an optical display cell in which a pair of substrate means are joined at the periphery thereof by a sealing means, comprising the steps of:
    depositing a sealing means at the periphery of a first one of a pair of substrate means;
    depositing a nylon adhesive on said first substrate in specific areas inboard of said sealing means to provide a constant visual symbol;
    randomly disposing a plurality of adhesive-free optically transparent spacer means on said first substrate means, said spacer means being uniform in size for maintaining an approximately uniform distance between said pair of substrate means; and pressing said pair of substrates together with said spacer means therebetween while raising the temperature to a temperature sufficient to soften said sealing means.

17. The method of claim 16, wherein said spacer means comprises glass fiber material.

* * * * *